March 26, 1929. C. W. DAKE 1,706,563
GENERATOR DRIVE FOR RAILROAD CARS AND THE LIKE
Filed June 17, 1926   8 Sheets-Sheet 1
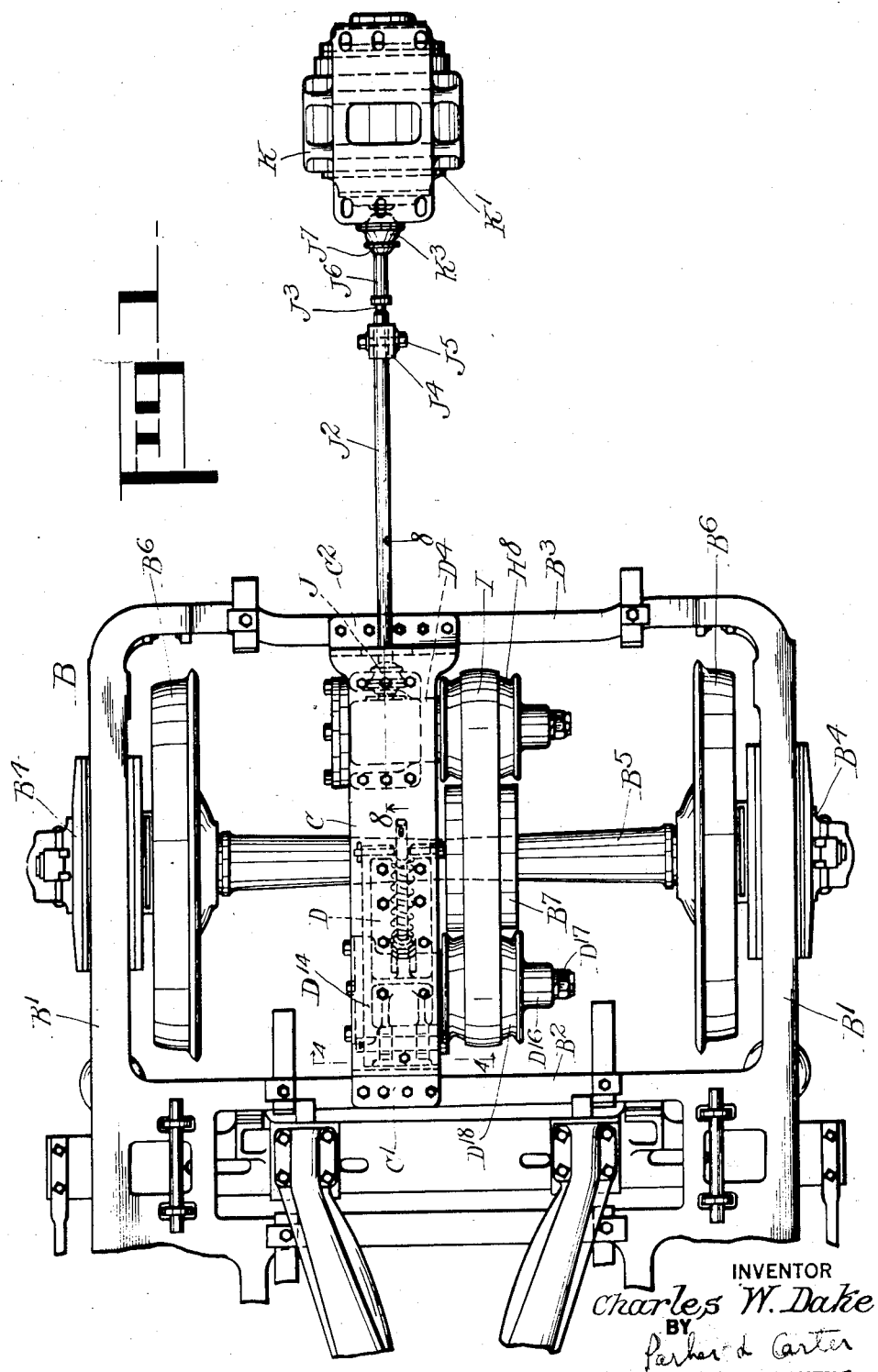
INVENTOR
Charles W. Dake
BY
Parker & Carter
ATTORNEYS

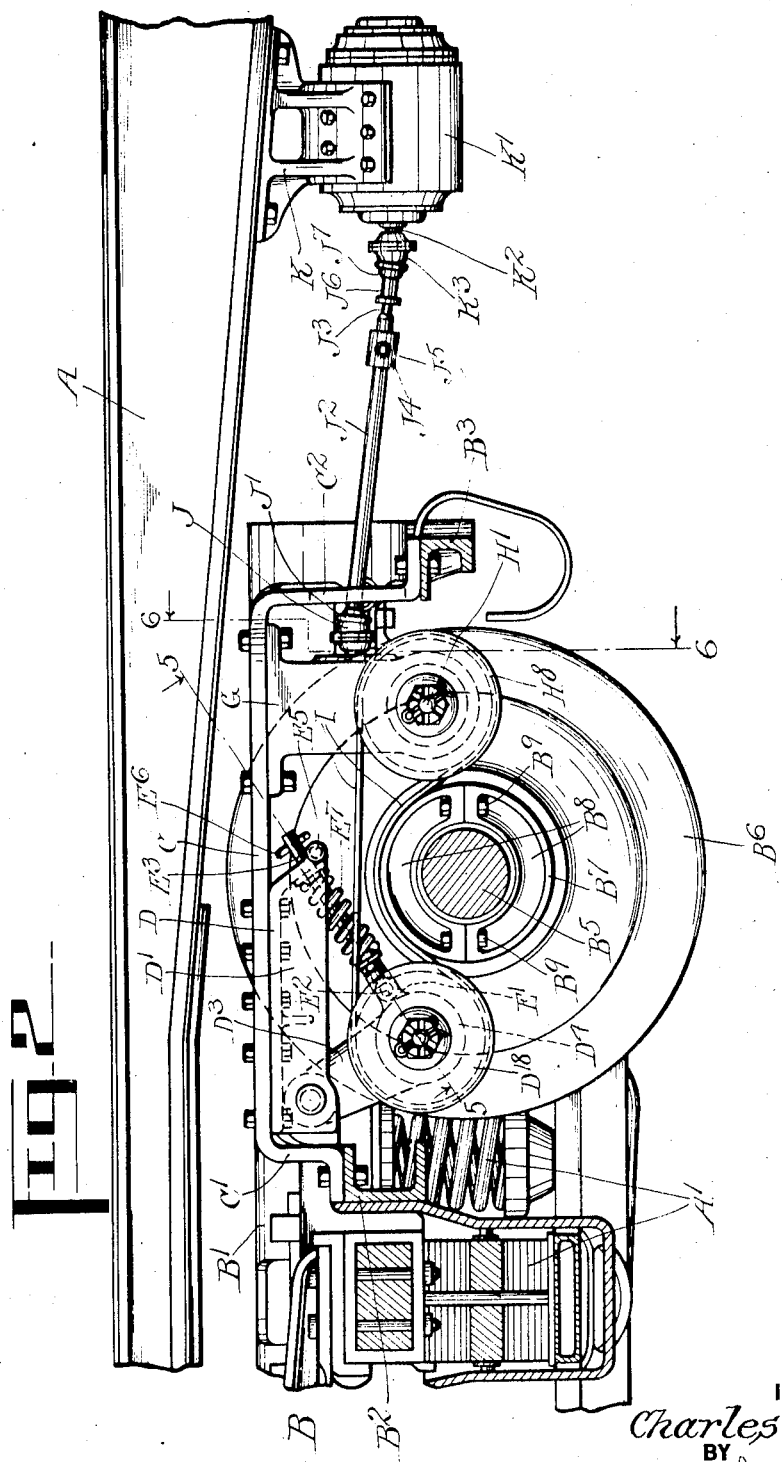

March 26, 1929.  C. W. DAKE  1,706,563
GENERATOR DRIVE FOR RAILROAD CARS AND THE LIKE
Filed June 17, 1926  8 Sheets-Sheet 3
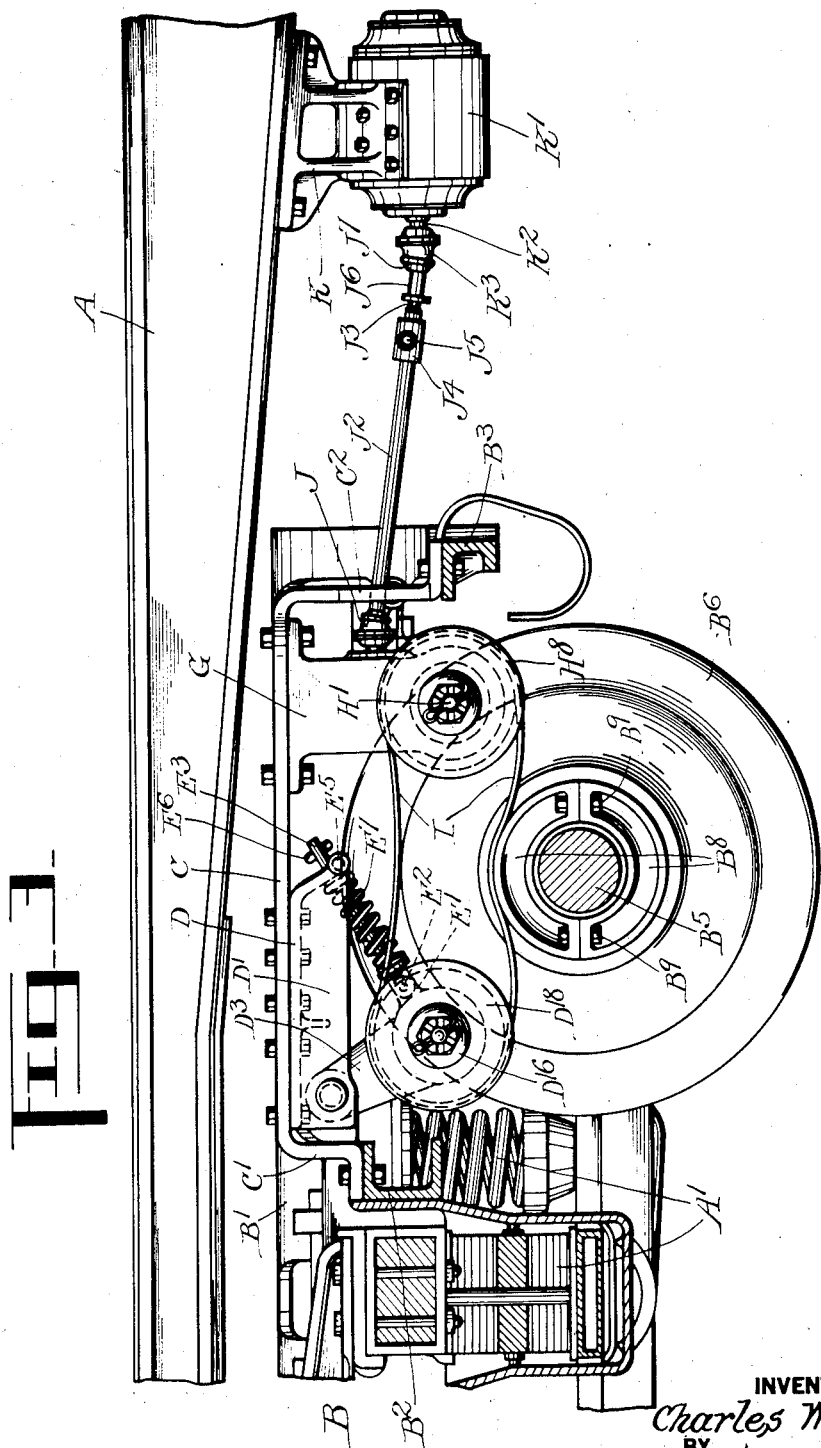
INVENTOR
Charles W. Dake
BY
Parker & Carter
ATTORNEYS.

March 26, 1929.  C. W. DAKE  1,706,563
GENERATOR DRIVE FOR RAILROAD CARS AND THE LIKE
Filed June 17, 1926   8 Sheets-Sheet 4
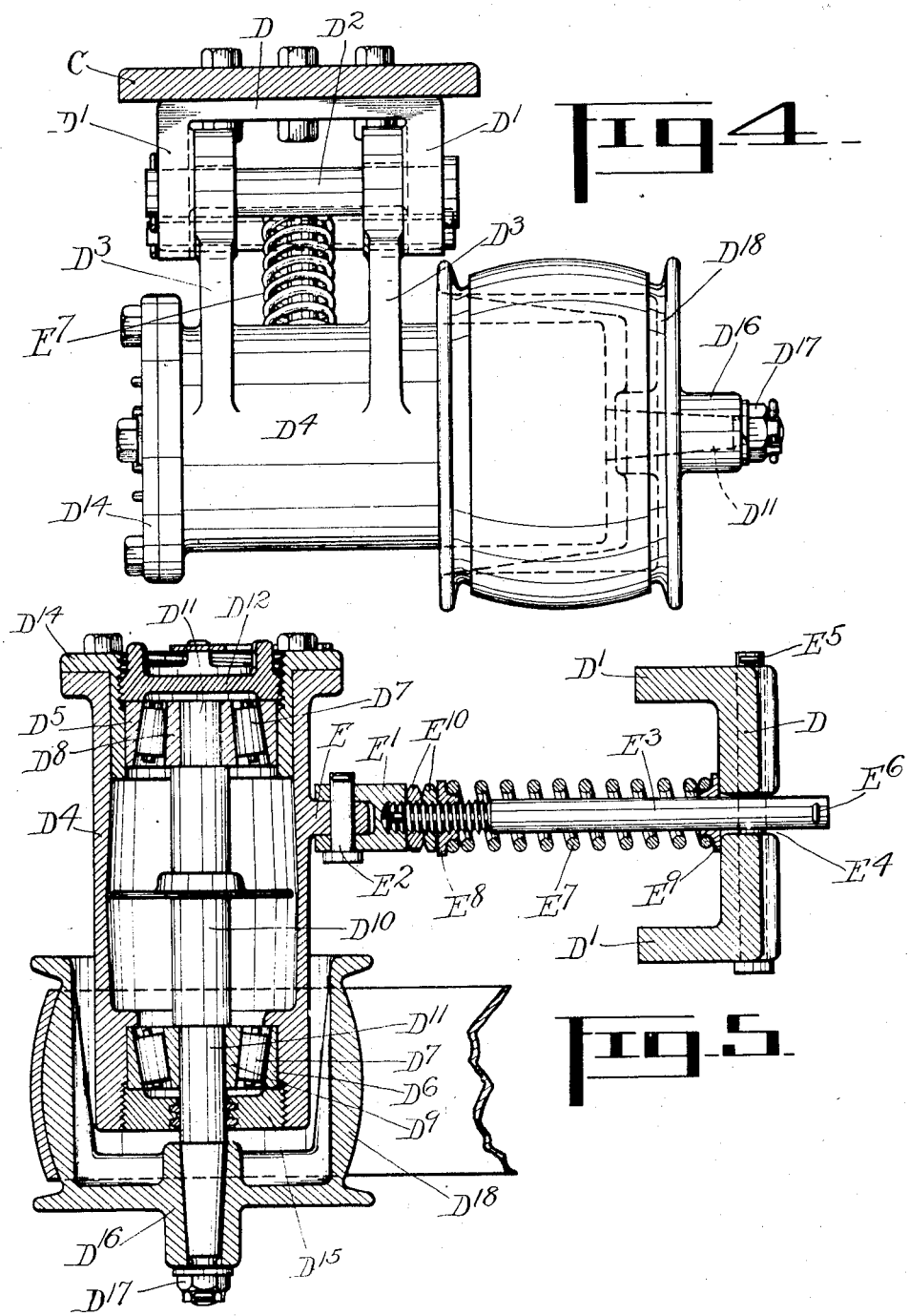
INVENTOR
Charles W. Dake
BY
Parker & Carter
ATTORNEYS.

March 26, 1929.   C. W. DAKE   1,706,563
GENERATOR DRIVE FOR RAILROAD CARS AND THE LIKE
Filed June 17, 1926    8 Sheets-Sheet 5
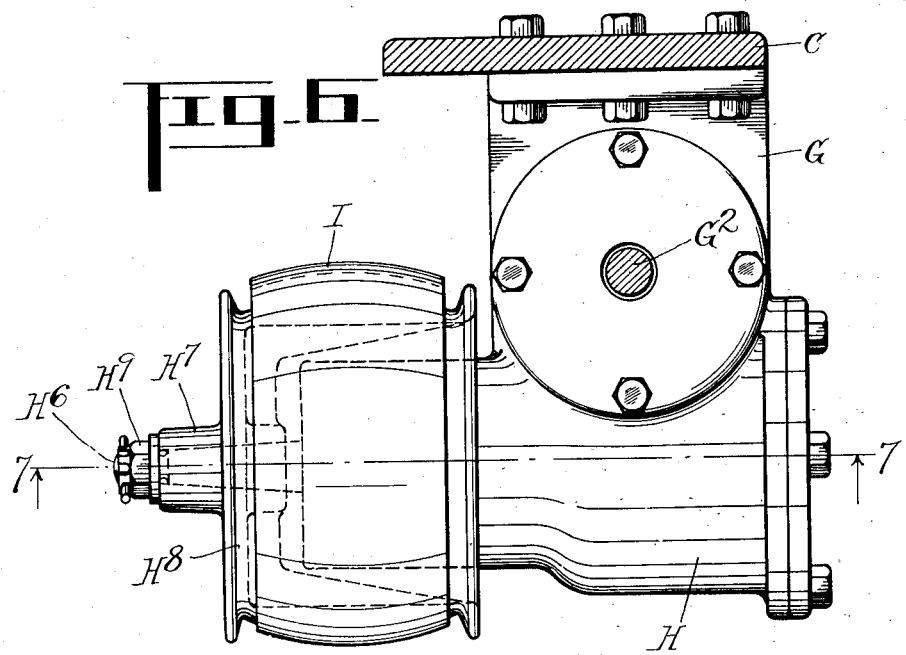
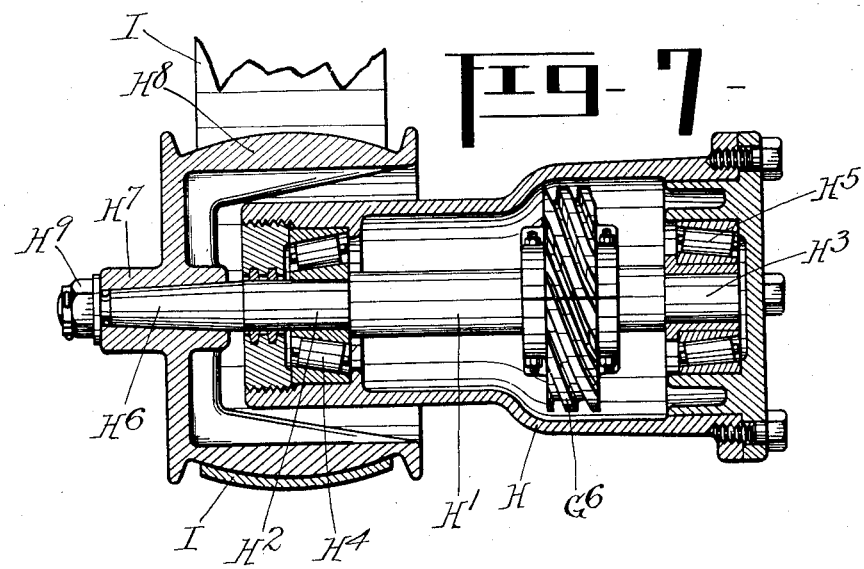
INVENTOR
Charles W. Dake
BY
Parker & Carter
ATTORNEY

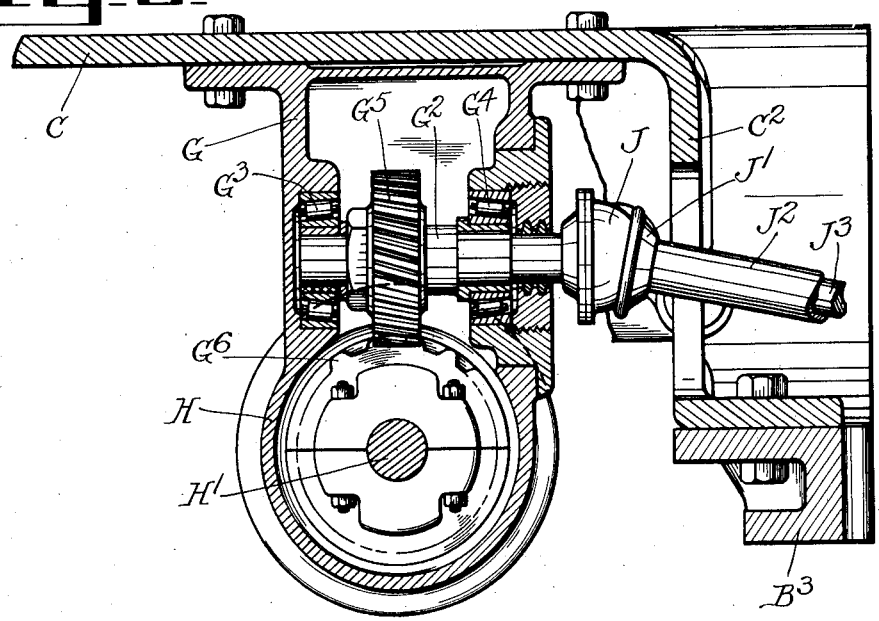
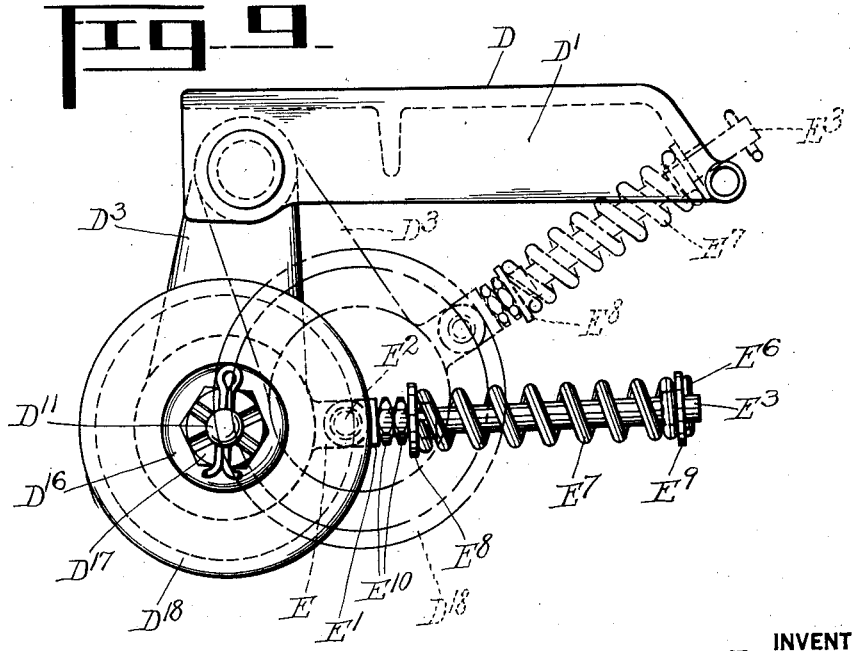

March 26, 1929. C. W. DAKE 1,706,563
GENERATOR DRIVE FOR RAILROAD CARS AND THE LIKE
Filed June 17, 1926 8 Sheets-Sheet 7
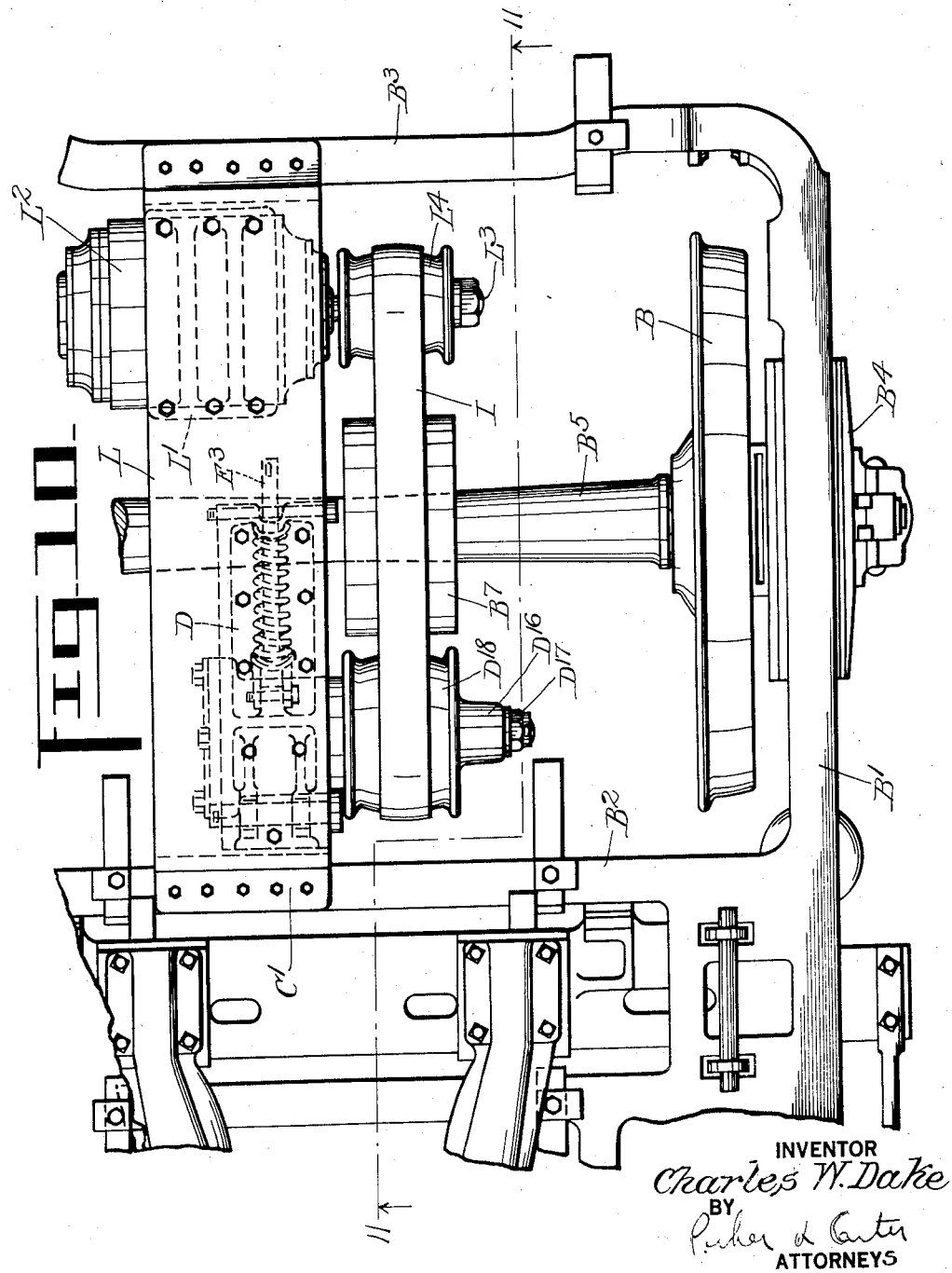
INVENTOR
Charles W. Dake
BY
ATTORNEYS March 26, 1929.   C. W. DAKE   1,706,563
GENERATOR DRIVE FOR RAILROAD CARS AND THE LIKE
Filed June 17, 1926   8 Sheets-Sheet 8
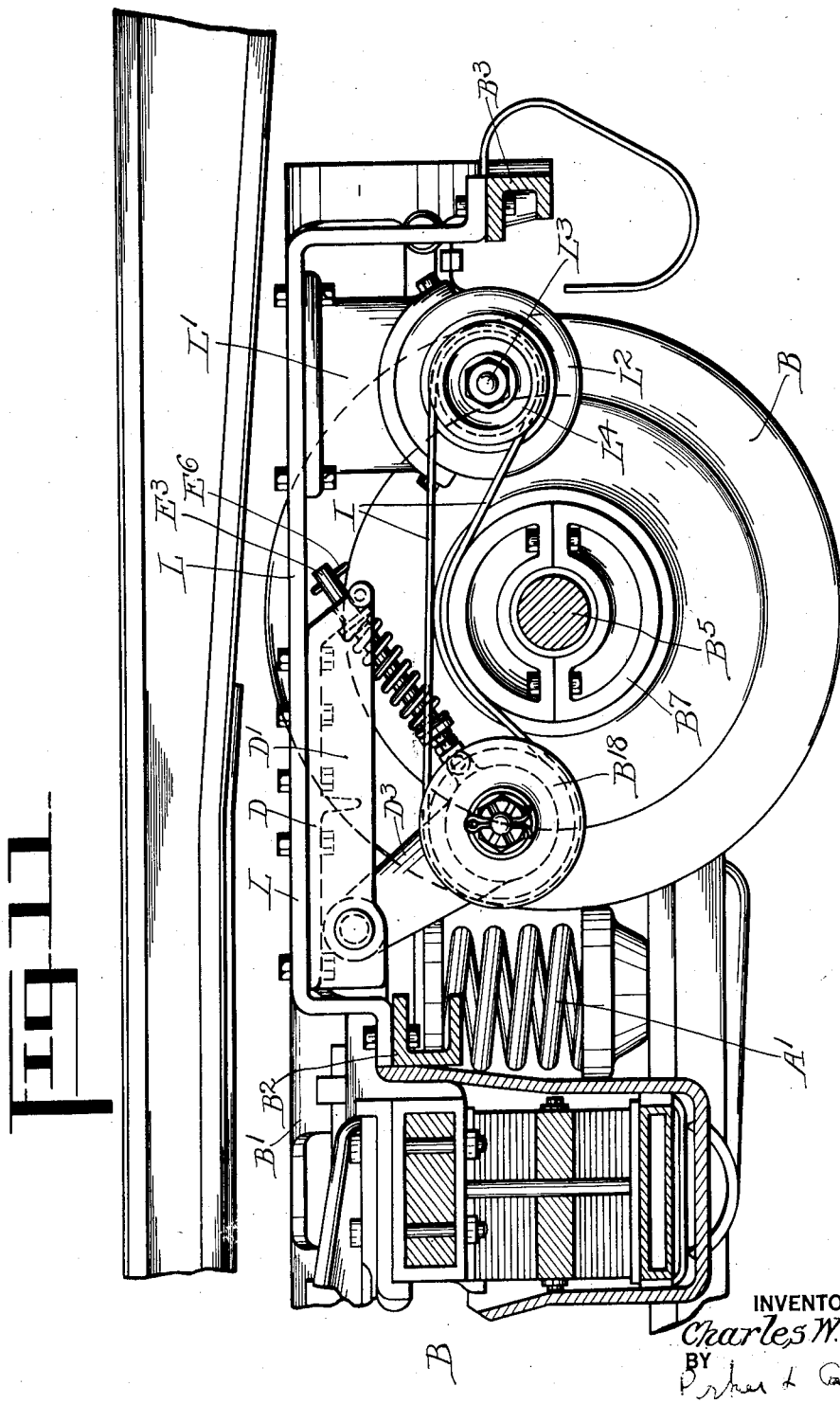
INVENTOR
Charles W. Dake
BY
ATTORNEYS.

Patented Mar. 26, 1929.

1,706,563

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

GENERATOR DRIVE FOR RAILROAD CARS AND THE LIKE.

Application filed June 17, 1926. Serial No. 116,514.

My invention relates to improvements in generator drives and has for one object to provide a new and improved drive for generators mounted upon vehicles and adapted to be driven in response to rotation of the vehicle wheels. One application of my invention is the provision of a generator drive for railroad vehicles or cars. Another object of my invention is the provision of means, associated with such a drive, for maintaining the driving and driven pulleys in constant alignment. Another object is to provide means for permitting the removal of the vehicle wheel and axle without affecting or necessitating the dismantling of the drive. Another object is to lengthen the life of the belts employed, and to prevent their breakage. Other objects will appear from time to time throughout the specification and claims.

My invention is illustrated more or less diagrammatically in the accompanying drawings wherein—

Figure 1 is a plan view;

Figure 2 is a longitudinal vertical section with parts in elevation;

Figure 3 is a view similar to Figure 2 illustrating the removal of the car wheel and axle;

Figure 4 is a section on the line 4—4 of Figure 1;

Figure 5 is a section on the line 5—5 of Figure 2;

Figure 6 is a section on the line 6—6 of Figure 2;

Figure 7 is a section on the line 7—7 of Figure 6;

Figure 8 is a section on the line 8—8 of Figure 1;

Figure 9 is a detail illustrating the idler bracket in various positions;

Figure 10 is plan view of an alternative form;

Figure 11 is a vertical longitudinal section on the line 11—11 of Figure 10;

Like parts are indicated by like characters throughout the specification and drawings.

A generally indicates any suitable car frame and $A^1$ the spring suspension therefor, they being not described in detail since they form no part of the present invention.

B generally indicates the car truck structure having side members $B^1 B^1$ and the transverse members $B^2 B^3$. $B^4 B^4$ generally indicates any suitable journal boxes in which are received the ends of the axle $B^5$. $B^6 B^6$ are wheels mounted upon said axle. $B^7$ is a driving pulley clamped about said axle or otherwise held against rotation or longitudinal movement in relation thereto. It may for example consist of the twin segments $B^8 B^8$ secured together by the bolts $B^9$. It is herein shown as cylindrical.

C is a longitudinal member or slab supported at one end upon the transverse member $B^2$ and at the other upon the transverse member $B^3$ for example by the downwardly depending end portions $C^1 C^2$.

Mounted upon the lower side of the slab C is the bracket member D, having the downwardly depending side flanges $D^1$ through which passes the pin $D^2$ to which are pivoted the bracket arms $D^3$ supporting the bearing housing $D^4$. Mounted in each end of said housing are the roller races $D^5 D^6$ provided with the rollers $D^7$ in engagement with the inner roller races or sleeves $D^8 D^9$ about the reduced ends $D^{11}$ of the shaft $D^{10}$. $D^{12}$ is a securing sleeve for one end of the housing and screw threaded into the closure member $D^{14}$. The opposite end of the shaft extends through the screw threaded closure member $D^{15}$ at the opposite end of the housing and receives the pulley hub $D^{16}$ secured by the lock nut $D^{17}$ and shown as integral with the pulley member $D^{18}$.

Pivoted to the lug E on the side of the housing $D^4$ is the yoke member $E^1$ secured by the pin $E^2$. Screw threaded into it is the rod $E^3$ the outer end of which is adapted to pass through the downwardly open slot $E^4$ in the opposite end of the bracket D and is retained therein by the pin $E^5$. $E^6$ is any suitable securing pin passing through the end of the rod $E^3$ and adapted to prevent complete withdrawal of the rod through the slot $E^4$. $E^7$ indicates a spiral spring compressed between the screw threaded abutment member $E^8$ screw threaded upon one end of the rod $E^3$ and the abutment member $E^9$ slidable along the rod. $E^{10}$ are any suitable adjustment nuts.

Secured to the opposite end of the slab C is a downwardly depending bracket member G, mounted in the upper portion thereof is the shaft $G^2$ rotatable in the roller bearings generally indicated as $G^3 G^4$ and provided with a spiral gear $G^5$ in mesh with the opposed spiral gear $G^6$. In the lower portion H of the housing is mounted the pulley shaft $H^1$ upon which is the said gear $G^6$. The shaft $H^1$ is supported at each end by its reduced portions $H^2 H^3$ in the roller bearings $H^4 H^5$.

The outwardly projecting portions of the shaft $H^6$ has secured to it the pulley hub $H^7$ and the pulley $H^8$. $H^9$ is any suitable lock nut for holding the pulley firmly in position upon the shaft. A driving belt I extends about the two pulleys $D^{18}$ and $H^8$ and is looped above the driving pulley $B^7$.

The shaft $G^2$ terminates in any suitable ball member J in communication with the socket member $J^1$ at the extremity of the driving sleeve $J^2$. In normally non-rotatable relation with the sleeve $J^2$ is the shaft $J^3$, the two being normally held against rotation by the locking member $J^4$, which carries the transverse screw $J^5$, adapted to penetrate sleeve and shaft. $J^6$ is a sleeve in splined relation with the shaft $J^3$, and terminating in the socket $J^7$ and in engagement with the ball member $K^3$ upon the generator shaft $K^2$.

K indicates any suitable bracket depending from the car frame member A. Secured to it is any suitable motor generator housing $K^1$, within which is positioned a generator the details of which form no part of the present invention. It will be understood that the generator shaft $K^2$ extends from the forward end of the housing and is provided with the universal ball member $K^3$.

Referring to Figures 10 and 11 I may employ an alternative form of my device in which the longitudinal slab L has mounted at its forward end the bracket D and associated parts, substantially as shown in Figures 1 and following. At the opposite end, however, is positioned the fixed bracket $L^1$ to which is secured the generator housing $L^2$, from which outwardly projects the motor shaft $L^3$ carrying the driven pulley $L^4$. It will be understood that the driving belt I extends about the pulleys $D^{18}$ and $L^4$ and is looped above the driving pulley $B^7$, as shown in Figure 2. However, the intermediate universal connection is dispensed with and the three pulleys are always and positively aligned.

It will be realized that whereas I have illustrated a practical and operative device that nevertheless many changes may be made without departing from the spirit of my invention and that I may employ a wide variety of parts and number of parts and details of construction and arrangements. I therefore, wish my drawings to be taken as in a large sense as diagrammatic rather than limiting me to a specific showing.

The driving belt for railroad lighting generators forms one of the most difficult problems in car maintenance. It frequently happens that the cost of furnishing belts for a single car runs as high as fifty dollars per month. The belts do not wear out so much as they break or are cut to pieces. One difficulty is that the fact that moisture gets into the ends of the belt where the belt is clamped or fastened together for assembly around the car axle. This moisture especially in winter freezes and the belt just breaks off. In summer the moisture gets into the belt and causes it to rot. Certainly ninety percent and more railroad engineers will testify to this fact. My invention contemplates the provision of a short endless belt which can be water-proof throughout, thus avoiding this breakage or destruction.

The use and operation of my invention are as follows:

Among the prevailing problems in motor generator practice as applied to motor railroad cars, are the alignment of driving and driven pulleys, the limiting of both wear and breakage of belts, and the avoidance of undue strain upon belt and generator. I provide for a positive alignment of the pulleys either by positioning the motor generator itself upon the car truck or by positioning a driven pulley upon the car truck, and providing a flexible driving connection between such pulley and the generator. In either case the relation of the pulleys is unaffected by the relative movement of truck and car frame.

In the form of Figures 1 and following I employ a drive pulley fixed on the axle, a driven pulley on the car truck, constantly aligned with the drive pulley, and an idler or tension pulley, mounted of the car truck and held against axial movement in relation to the drive and driven pulleys, but yieldingly positioned upon a bracket pivoted to the truck for rotation about an axis parallel with the axis of rotation of the axle. Referring to Figure 2, I employ a bracket arm $D^3$ normally thrust by the compression spring $E^7$ into tensional position, thus holding belt I tightly against the driving pulley, the belt engaging such pulley about a substantial proportion of its periphery. In this form of my device I provide a flexible and longitudinally extensible driving connection between the driven pulley and the generator, which includes the shaft $G^2$ driven from the driven pulley, the ball and socket members J, $J^1$, the hollow shaft or sleeve $J^2$, the shaft $J^3$, the sleeve $J^6$, in nonrotatable and telescopic relation therewith and the second pair of ball and socket members $J^7$, $K^3$. Thus no matter what the position of the car truck, the belt and pulleys are always aligned, and the driving connection between the driven pulley and the generator shaft is constant and undisturbed.

In the form of my device shown in Figures 10 and 11, I eliminate the intermediate universal and flexible driving connection between the driven pulley and the generator and mount the generator itself on the car truck, the generator pulley $L^4$ being thus positively and constantly aligned with the flexibly mounted pulley $D^{18}$ and the drive pulley $B^7$ on the axle.

The driving and the driven pulleys being close together I employ a short belt and I prefer to eliminate all difficulties caused by belt fasteners by employing a close woven belt.

It will be observed that in both forms of my device the driving connection as a unit is undisturbed when the car wheel and axle are removed.

This is indicated in Figure 3, which diagrammatically shows that the only effect of removing the car wheel, by lowering the axle from beneath the car is to relax the tension on the belt I. This not only permits easier and quicker removal of the wheel, but avoids any necessity of moving or removing parts of the drive and thus avoids the risk of changes in alignment or adjustment.

When it is desired to test the generator by running it as a motor, I may release the lock member $J^4$, thus breaking the flexible driving connection illustrated in Figure 3.

This is important because the only way in which the generator can practically be tested is by disengaging the drive from the axle, running the generator as a motor and testing its electrical operation. This furnishes a convenient and easy test and in a railroad where large numbers of cars have to be handled such a test as this is practically essential.

I claim:

1. A generator drive for railroad cars and the like comprising a truck having a wheeled axle with a driving pulley thereon, idler pulleys mounted on the truck, located on each side of the driving pulley, and having supports located at one side of their working faces only and an endless belt traveling over the idler pulleys and engaging the driving pulley on the upper side thereof only.

2. A generator drive for railroad cars and the like comprising a truck having a wheeled axle with a driving pulley thereon, idler pulleys mounted on the truck, located on each side of the driving pulley, and having supports located at one side of their working faces only and an endless belt traveling over the idler pulleys and engaging the driving pulley on the upper side thereof only, a generator on the car and a driving connection between it and one of the idler pulleys.

3. A generator drive for railroad cars and the like comprising a truck having a wheeled axle with a driving pulley thereon, idler pulleys mounted on the truck, located on each side of the driving pulley, and having supports located on one side of their working faces only and an endless belt traveling over the idler pulleys and engaging the driving pulley on the upper side thereof only, a support for one of the idlers comprising a radius arm pivoted on the truck extending downwardly, its axis prolonged approaching a tangent to the driving pulley and means for yieldingly swinging the idler pulley away from the driving pulley to exert a tension on the belt.

4. A generator drive for railroad cars and the like comprising a truck having a wheeled axle with a driving pulley thereon, idler pulleys mounted on the truck, located on each side of the driving pulley, and having supports located at one side of their working faces only and an endless belt traveling over the idler pulleys and engaging the driving pulley on the upper side thereof only, the support for one of the idlers comprising a radius arm pivoted on the truck and free to swing in an arc toward and from the driving pulley, yielding means for forcing it away from the driving pulley to exert a tension on the belt.

5. A generator drive for railroad cars and the like comprising a truck having a wheeled axle with a driving pulley thereon, idler pulleys mounted on the truck, located on each side of the driving pulley, and having supports located at one side of their working faces only and an endless belt traveling over the idler pulleys and engaging the driving pulley on the upper side thereof only, the support for one of the pulleys comprising a hanger pivoted on the truck, an abutment, a pin pivoted on the hanger and slidable in the abutment and a spring between the abutment and the hanger.

6. A generator drive for railroad cars and the like comprising a truck having a wheeled axle with a driving pulley thereon, idler pulleys mounted on the truck, located on each side of the driving pulley, and having supports located at one side of their working faces only and an endless belt traveling over the idler pulleys and engaging the driving pulley on the upper side thereof only, the support for one of the pulleys comprising a hanger pivoted on the truck, an abutment, a pin pivoted on the hanger and slidable in the abutment and a spring between the abutment and the hanger, and a stop limiting the movement of the pin through the abutment.

7. The combination with a railroad car truck of a generator drive frame removably mounted thereon, a pair of pulleys carried by and in fixed relation to said frame, a drive pulley on the car axle located between the pulleys of the pair, an endless belt extending around said pulleys and engaging the upper side of the driving pulley, the pair of pulleys projecting laterally from the frame and supported thereon at one side of their working faces only.

8. The combination with a railroad car truck of a generator drive frame removably mounted thereon, a pair of pulleys carried by and in fixed relation to said frame, a drive pulley on the car axle located between the pulleys of the pair, an endless belt extending around said pulleys and engaging the upper side of the driving pulley, the pair of pulleys projecting laterally from the frame and supported thereon at one side of their working faces only, an electric generator and a driving connection between it and one of the pulleys.

9. The combination with a railroad car truck of a generator drive frame removably mounted thereon, a pair of pulleys carried by and in fixed relation to said frame, a drive pulley on the car axle located between the pulleys of the pair, an endless belt extending around said pulleys and engaging the upper side of the driving pulley, the pair of pulleys projecting laterally from the frame and supported thereon at one side of their working faces only, an electric generator rigidly mounted on the car body, the axis thereof being perpendicular to the car axle and a driving connection between the generator and one of the pulleys.

10. The combination with a railroad car truck of a generator drive frame removably mounted thereon, a pair of pulleys carried by and in fixed relation to said frame, a drive pulley on the car axle located between the pulleys of the pair, an endless belt extending around said pulleys and engaging the upper side of the driving pulley, a pair of pulleys projecting laterally from the frame and supported thereon at one side of their working faces only, a generator mounted on the car body, a connection between it and one of the pulleys.

11. The combination with a railroad car truck of a generator drive frame removably mounted thereon, a pair of pulleys carried by and in fixed relation to said frame, a drive pulley on the car axle located between the pulleys of the pair, an endless belt extending around said pulleys and engaging the upper side of the driving pulley, the pair of pulleys projecting laterally from the frame and supported thereon at one side of their working faces only, a generator mounted on the car body, a connection between it and one of the pulleys, the axis of the generator being perpendicular to the car axle and the connection comprising a drive shaft, a universal joint therein, the shaft being extensible longitudinally.

12. The combination with a railroad car truck of a generator drive frame removably mounted thereon, a pair of pulleys carried by and in fixed relation to said frame, a drive pulley on the car axle located between the pulleys of the pair, an endless belt extending around said pulleys and engaging the upper side of the driving pulley, the pair of pulleys projecting laterally from the frame and supported thereon at one side of their working faces only, a gear box associated with one of said pulleys, a gear therein rigidly mounted on the pulley shaft, a gear in mesh therewith at right angles to the first gear adapted to be driven by the first named gear and a connection from said driven gear to a generator.

13. The combination with a railroad car truck of a generator drive frame removably mounted thereon, a pair of pulleys carried by and in fixed relation to said frame, a drive pulley on the car axle located between the pulleys of the pair, an endless belt extending around said pulleys and engaging the upper side of the driving pulley, the pair of pulleys projecting laterally from the frame and supported thereon at one side of their working faces only, a gear box associated with one of said pulleys, a gear therein rigidly mounted on the pulley shaft, a gear in mesh therewith at right angles to the first gear adapted to be driven by the first named gear and a connection from said driven gear to a generator, the generator being mounted on the car body, a shaft extending from the gear box to the generator having universal joints therein and being extensible.

14. The combination with a railroad car truck of a generator drive frame removably mounted thereon, a pair of pulleys carried by and in fixed relation to said frame, a drive pulley on the car axle located between the pulleys of the pair, an endless belt extending around said pulleys and engaging the upper side of the driving pulley, the pair of pulleys projecting laterally from the frame and supported thereon at one side of their working faces only, a gear box associated with one of said pulleys, a gear therein rigidly mounted on the pulley shaft, a gear in mesh therewith at right angles to the first gear adapted to be driven by the first named gear and a connection from said driven gear to a generator, the generator being mounted on the car body, the axis of the generator being substantially parallel with the axis of the driven gear.

15. In combination with an idler pulley for railroad car generator drives and the like, a supporting member, a tubular barrel, a plurality of longitudinally spaced arms projecting radially therefrom and pivoted to the supporting member, anti-friction bearings located at either end of the cylinder barrel, a pulley shaft carried thereby projecting outwardly through the one end of the barrel, a pulley mounted on the shaft surrounding the end of the barrel, a lug projecting laterally from the barrel, an adjustable pin pivoted on the lug slidable through the member at a point removed from the pivot line, a coil spring compressed between the supporting member and pin.

16. In combination with an idler pulley for railroad car generator drives and the like, a supporting member, a tubular barrel, a plurality of longitudinally spaced arms projecting radially therefrom and pivoted to the supporting member, anti-friction bearings located at either end of the cylinder barrel, a pulley shaft carried thereby projecting outwardly through the one end of the barrel, a pulley mounted on the shaft surrounding the end of the barrel, a lug projecting laterally from the barrel, an adjustable pin pivoted on the lug slidable through the member at a point removed from the pivot line, a coil spring compressed between the supporting member and pin, and a stop limiting the movement of the adjustable pin in response to the urge of the pressure of the spring.

17. A generator drive for railroad cars and the like comprising a pair of pulleys, means for supporting them at one side only, a driving pulley on the car axle, the face of which is substantially cylindrical, an endless belt traveling over the pair of pulleys and engaging the upper side of the driving pulley only.

Signed at Chicago, county of Cook, and State of Illinois, this 9th day of June, 1926.

CHARLES W. DAKE.